United States Patent
Kobach

(10) Patent No.: US 12,249,100 B2
(45) Date of Patent: Mar. 11, 2025

(54) HIGHLY-ACCURATE AND SELF-ADJUSTING IMAGING SENSOR AUTO-CALIBRATION FOR IN-VEHICLE ADVANCED DRIVER ASSISTANCE SYSTEM (ADAS) OR OTHER SYSTEM

(71) Applicant: Omnitracs, LLC, Westlake, TX (US)

(72) Inventor: Andrew C. Kobach, San Diego, CA (US)

(73) Assignee: Omnitracs, LLC, Westlake, TX (US)

( * ) Notice: Subject to any disclaimer, the term of this patent is extended or adjusted under 35 U.S.C. 154(b) by 271 days.

(21) Appl. No.: 17/514,912

(22) Filed: Oct. 29, 2021

(65) Prior Publication Data

US 2023/0136214 A1    May 4, 2023

(51) Int. Cl.
  G06T 7/80    (2017.01)
  G06T 7/20    (2017.01)
  G06T 7/536   (2017.01)
  G06T 7/73    (2017.01)
  G06V 20/56   (2022.01)

(52) U.S. Cl.
  CPC ............ *G06T 7/80* (2017.01); *G06T 7/536* (2017.01); *G06V 20/588* (2022.01); *G06T 2207/30256* (2013.01)

(58) Field of Classification Search
  None
  See application file for complete search history.

(56) References Cited

U.S. PATENT DOCUMENTS

| | | | |
|---|---|---|---|
| 11,080,544 B1* | 8/2021 | Kim | G06V 10/255 |
| 2011/0115912 A1* | 5/2011 | Kuehnle | G06V 20/588 |
| | | | 348/148 |
| 2015/0161456 A1 | 6/2015 | Chevalley | |
| 2017/0001566 A1* | 1/2017 | Lu | B60R 1/00 |
| 2021/0387637 A1* | 12/2021 | Rogers | H04W 4/029 |

OTHER PUBLICATIONS

Orghidan et al., "Camera calibration using two or three vanishing points", Proceedings of the Federated Conference on Computer Science and Information Systems, 2012, 8 pages.
Liu et al., "D-VPnet: A Network for Real-time Dominant Vanishing Point Detection in Natural Scenes", Jun. 2020, 18 pages.
Yuan et al., "Robust Lane Detection for Complicated Road Environment Based on Normal Map", Sep. 2018, 11 pages.
(Continued)

*Primary Examiner* — Samuel D Fereja

(57) ABSTRACT

A method includes obtaining multiple images of a scene using an imaging sensor associated with a vehicle, where the images of the scene capture lane marking lines associated with a traffic lane in which the vehicle is traveling. The method also includes identifying, in each of at least some of the images, a vanishing point based on the lane marking lines captured in the image. The method further includes identifying an average position of the vanishing points in the at least some of the images. In addition, the method includes determining one or more extrinsic calibration parameters of the imaging sensor based on the average position of the vanishing points. The one or more extrinsic calibration parameters of the imaging sensor may include a pitch angle and a yaw angle of the imaging sensor.

20 Claims, 6 Drawing Sheets

(56) References Cited

OTHER PUBLICATIONS

"Camera Calibration Settings (Automatic Vanishing Point)—Samsara Support", Jun. 2021, 5 pages.
"Extrinsic Camera Calibration—Algorithms for Automated", https://thomasfermi.github.io, Sep. 2021, 11 pages.
Guillou et al., "Using Vanishing Points for Camera Calibration and Coarse 3D Reconstruction from a Single Image", The Visual Computer, Nov. 2000, 16 pages.
Caprile et al., "Using Vanishing Points for Camera Calibration", International Journal of Computer Vision, 1990, 13 pages.
Liu et al., "Motion Constraints and Vanishing Point Aided Land Vehicle Navigation", Micromachines, May 2018, 24 pages.
International Search Report and Written Opinion of the International Searching Authority dated Nov. 16, 2022 in connection with International Patent Application No. PCT/US2022/074976, 13 pages.

\* cited by examiner

HIGHLY-ACCURATE AND SELF-ADJUSTING IMAGING SENSOR AUTO-CALIBRATION FOR IN-VEHICLE ADVANCED DRIVER ASSISTANCE SYSTEM (ADAS) OR OTHER SYSTEM

TECHNICAL FIELD

This disclosure generally relates to computer vision systems. More specifically, this disclosure relates to highly-accurate and self-adjusting imaging sensor auto-calibration for an in-vehicle advanced driver assistance system (ADAS) or other system.

BACKGROUND

Advanced driver assistance system (ADAS) features are being incorporated into more and more vehicles over time. ADAS systems generally support features implemented using various technologies that assist drivers in performing driving and parking functions. Among other things, ADAS systems often use cameras or other imaging sensors to capture images and identify information related to vehicles during travel. For example, ADAS systems can process images captured by imaging sensors on vehicles in order to identify lane marking lines associated with traffic lanes in which the vehicles are traveling. The identification of lane marking lines associated with a traffic lane in which a vehicle is traveling can be used for various purposes, such as to trigger an audible or other warning if the vehicle appears to be straying from its current traffic lane while a turn signal indicator (blinker) of the vehicle is not activated. In some cases, this type of information or other information obtained by processing images associated with a vehicle may be used to generate an estimated measure of the attentiveness or inattentiveness of a vehicle's driver.

SUMMARY

This disclosure relates to highly-accurate and self-adjusting imaging sensor auto-calibration for an in-vehicle advanced driver assistance system (ADAS) or other system.

In a first embodiment, a method includes obtaining multiple images of a scene using an imaging sensor associated with a vehicle, where the images of the scene capture lane marking lines associated with a traffic lane in which the vehicle is traveling. The method also includes identifying, in each of at least some of the images, a vanishing point based on the lane marking lines captured in the image. The method further includes identifying an average position of the vanishing points in the at least some of the images. In addition, the method includes determining one or more extrinsic calibration parameters of the imaging sensor based on the average position of the vanishing points.

In a second embodiment, an apparatus includes at least one processing device configured to obtain multiple images of a scene using an imaging sensor associated with a vehicle, where the images of the scene capture lane marking lines associated with a traffic lane in which the vehicle is traveling. The at least one processing device is also configured to identify, in each of at least some of the images, a vanishing point based on the lane marking lines captured in the image. The at least one processing device is further configured to identify an average position of the vanishing points in the at least some of the images. In addition, the at least one processing device is configured to determine one or more extrinsic calibration parameters of the imaging sensor based on the average position of the vanishing points.

In a third embodiment, a non-transitory machine-readable medium contains instructions that when executed cause at least one processor to obtain multiple images of a scene using an imaging sensor associated with a vehicle, where the images of the scene capture lane marking lines associated with a traffic lane in which the vehicle is traveling. The medium also contains instructions that when executed cause the at least one processor to identify, in each of at least some of the images, a vanishing point based on the lane marking lines captured in the image. The medium further contains instructions that when executed cause the at least one processor to identify an average position of the vanishing points in the at least some of the images. In addition, the medium contains instructions that when executed cause the at least one processor to determine one or more extrinsic calibration parameters of the imaging sensor based on the average position of the vanishing points.

Other technical features may be readily apparent to one skilled in the art from the following figures, descriptions, and claims.

BRIEF DESCRIPTION OF THE DRAWINGS

For a More Complete Understanding of this Disclosure and its Advantages, Reference is Now Made to the Following Description, Taken in Conjunction with the Accompanying Drawings, in which Like Reference Numerals Represent Like Parts.

DETAILED DESCRIPTION

Figure 1:
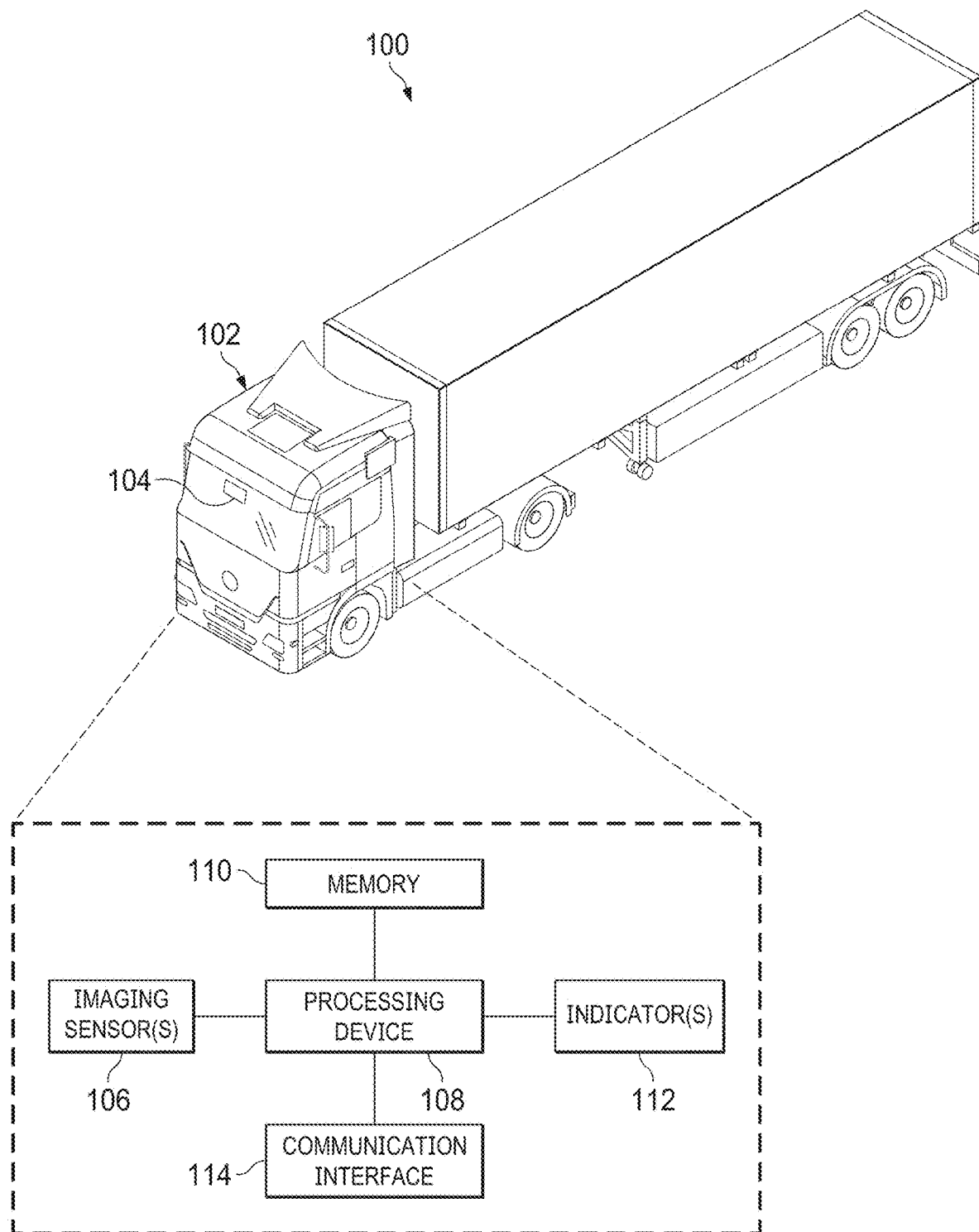
FIG. 1 illustrates an example system supporting highly-accurate and self-adjusting imaging sensor auto-calibration for an in-vehicle advanced driver assistance system (ADAS) or other system according to this disclosure.

FIGS. 1 through 5, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, advanced driver assistance system (ADAS) features are being incorporated into more and more vehicles over time. ADAS systems generally support features implemented using various technologies that assist drivers in performing driving and parking functions. Among other things, ADAS systems often use cameras or other imaging sensors to capture images and identify information related to vehicles during travel. For example, ADAS systems can process images captured by imaging sensors on vehicles in order to identify lane marking lines associated with traffic lanes in which the vehicles are traveling. The identification of lane marking lines associated with a traffic lane in which a vehicle is traveling can be used for various purposes, such as to trigger an audible or other warning if the vehicle appears to be straying from its current traffic lane while a turn signal indicator (blinker) of the vehicle is not activated. In some cases, this type of information or other information obtained by processing images associated with a vehicle may be used to generate an estimated measure of the attentiveness or inattentiveness of a vehicle's driver.

Cameras and other imaging sensors used in ADAS systems and other in-vehicle systems generally need to be calibrated, which often involves identifying characteristics of the imaging sensors as installed on the vehicles. For example, the actual location of an imaging sensor on a vehicle and the orientation of the imaging sensor on the vehicle (such as its pitch and yaw angles) may need to be identified so that this information can be used in various mathematical calculations during use. As a particular example, the pitch and yaw angles of an imaging sensor may need to be determined so that images from the imaging sensor can be processed in order to identify distances to lane marking lines, other vehicles, or other objects. When imaging sensors are installed on vehicles during the manufacture of the vehicles on an assembly line, it may be possible to install the imaging sensors at substantially the same location and at substantially the same orientation on multiple vehicles of the same type (such as the same make and model). In those cases, it may be possible to calibrate the imaging sensors using the same information, meaning each imaging sensor itself may not require a unique calibration (at least in relation to its position and orientation on a vehicle).

Imaging sensors can also be installed on vehicles after their manufacture, which is typically referred to as "aftermarket" installation. During these or other types of installations, imaging sensors may be installed on different vehicles at different locations and at different orientations. Even if installation locations are similar to one another and installation orientations are similar to one another, each of the imaging sensors typically needs to undergo its own calibration process in order to precisely identify its pitch and yaw angles, and the results of the calibration process depend on the specific location and the specific orientation of each imaging sensor. An effective calibration process allows information to be obtained so that images from each imaging sensor can be processed in order to accurately identify information such as distances to lane marking lines and distances to objects (such as other vehicles) around the associated vehicle. However, performing an effective calibration process can be difficult to due to various circumstances.

In one prior approach, an imaging sensor is installed on a vehicle, and manual measurements identifying the location of the imaging sensor on the vehicle are obtained. Also, a large vinyl banner or other banner is placed on the ground in front of the vehicle. The banner includes multiple lines or other known markings, and the banner is placed at a known distance in front of the vehicle. The imaging sensor on the vehicle is used to capture images of the banner, and the images and the manual measurements are processed in order to estimate extrinsic calibration parameters associated with the imaging sensor. These extrinsic calibration parameters depend (among other things) on the location of the imaging sensor on the vehicle and the orientation of the imaging sensor on the vehicle.

While this approach may provide acceptable accuracy in the identification of certain extrinsic calibration parameters of an imaging sensor (such as its pitch and yaw angles), this approach suffers from a number of shortcomings. For example, this approach can be difficult, time-consuming, and costly to perform, and this approach typically cannot be performed during inclement weather (such as during windy or rainy conditions). Also, this approach assumes that a vehicle and a banner are in the same plane, which may not always be the case (such as on sloped parking lots). Further, this approach typically requires an installer to position a banner exactly in the mid-line of a vehicle at a large distance (such as twenty to thirty feet away) from the vehicle, which may be difficult to ensure. In addition, if the calibration process is not performed correctly, there may be no way to correct the extrinsic calibration parameters without taking a vehicle out of service, and the incorrect extrinsic calibration parameters can lead to a high rate of false-positive triggers related to tailgating, lane departure, forward collision, or other warnings generated by a vehicle based on images from its incorrectly-calibrated imaging sensor.

This disclosure provides techniques for performing highly-accurate and self-adjusting imaging sensor auto-calibration for an in-vehicle ADAS system or other system. As described in more detail below, measurements can be obtained that identify the position of an imaging sensor on a vehicle, such as measurements identifying the distance of the imaging sensor from one or more specified points or axes of the vehicle. The imaging sensor is also used to capture images of a road or other surface in front of the vehicle while the vehicle is being driven. The images are processed to identify lane marking lines for a traffic lane in which the vehicle is traveling, and the identified lane marking lines are used to identify vanishing points within the images. The locations of the identified vanishing points can be averaged in order to identify an average position of the vanishing points within the images. The average position of the vanishing points in the images is used, along with one or more intrinsic calibration parameters of the imaging sensor (such as its focal lengths and sensor centers), to identify one or more extrinsic calibration parameters of the imaging sensor (such as its pitch and yaw angles).

The one or more extrinsic calibration parameters of the imaging sensor that are identified as described above can then be used in any suitable manner. For example, the one or more extrinsic calibration parameters of the imaging sensor can be stored and used to identify distances to lane marking lines, other vehicles, or other objects during travel. The identified distances may be used to trigger audible or other warnings, such as a warning that the vehicle is tailgating another vehicle, has departed from its current traffic lane without signaling, or is about to impact another vehicle or other object. The identified distances to lane marking lines, other vehicles, or other objects may also or alternatively be used to generate an estimated measure of the attentiveness or inattentiveness of the vehicle's driver or to identify specific instances of driver inattentiveness. For instance, the driver may be determined to be less attentive when the vehicle departs from its current traffic lane without signaling more often.

These techniques for performing highly-accurate and self-adjusting imaging sensor auto-calibration for an in-vehicle ADAS system or other system can operate under the assumption that lane marking lines for a traffic lane in which a vehicle is traveling will appear generally parallel to one another (at least to within some desired threshold). This can be particularly true when the vehicle is traveling at a relatively fast speed. Given this, it is possible for certain images captured by an imaging sensor on the vehicle to be processed assuming that the lane marking lines are parallel to one another. This allows the vanishing point defined by the identified lane marking lines in each image to be determined, and the vanishing points can be averaged and used in various calculations to identify the one or more extrinsic calibration parameters for the imaging sensor.

In this way, the disclosed techniques allow for effective calibration of an imaging sensor used in a vehicle's ADAS system or other system. The calibration can be performed easily and without requiring the manual placement of a banner or other object in front of the imaging sensor. The calibration can therefore be performed much faster, at lower cost, and with higher accuracy. In some cases, for instance, these techniques may allow the orientation of an imaging sensor on a vehicle to be estimated to within one tenth of a degree or less in terms of both pitch angle and yaw angle. Moreover, since the orientation of the imaging sensor is used to estimate distances to lane marking lines, other vehicles, or other objects, these techniques allow for more accurate distances to be obtained. This can help to increase the reliability of the distance measurements themselves and to increase the reliability of tailgating, lane departure, forward collision, or other warnings generated based on the distances. This can also or alternatively help to increase the accuracy of estimated measurements regarding the attentiveness or inattentiveness of the vehicle's driver (as based on the distances). In addition, these techniques can be repeated as needed or desired, such as daily, periodically, intermittently, or at any other suitable times. This may allow, for example, one or more updated extrinsic calibration parameters associated with the imaging sensor to be obtained and used over time.

FIG. 1 illustrates an example system 100 supporting highly-accurate and self-adjusting imaging sensor auto-calibration for an in-vehicle ADAS system or other system according to this disclosure. As shown in FIG. 1, the system 100 includes or is used in conjunction with a vehicle 102. In this particular example, the vehicle 102 represents a tractor-trailer truck, which includes a tractor having a cab in which a driver sits and a trailer pulled by the tractor. Note, however, that this type of vehicle 102 is for illustration only and that the system 100 may be used with any other suitable type of vehicle. Other example types of vehicles that can be used here may include passenger sedans, pickup trucks, sport utility vehicles, passenger vans, box trucks, and buses.

The vehicle 102 has an imaging system 104, which in this example may be mounted on the interior surface of a front windshield of the vehicle 102. Note, however, that the actual position of the imaging system 104 can vary as needed or desired. The imaging system 104 includes one or more cameras or other imaging sensors 106 that are used to capture images or other image-related data associated with the vehicle 102. For example, the imaging system 104 may include one or more forward-facing imaging sensors that are used to capture images of scenes in front of the vehicle 102, such as images of the road or other surface in front of the vehicle 102. These images may capture lane marking lines that identify the current traffic lane in which the vehicle 102 is traveling and one or more other traffic lanes supporting traffic flow in the same direction and/or in different direction(s). The images may also capture one or more other vehicles traveling in the same direction as the vehicle 102 and/or in other direction(s). The images may further capture other content, such as pedestrians, light poles, buildings, or background (such as the ground, sky, hills, mountains, etc.). In some cases, the imaging system 104 may also include at least one driver-facing imaging sensor, which may be used to capture images of the driver of the vehicle 102. These images may be used, for instance, to determine if the driver is looking at his or her mobile phone, is drowsy, or otherwise might be inattentive. However, the use of any driver-facing imaging sensor is optional here.

The vehicle 102 also includes at least one processing device 108, which can process one or more types of information in the vehicle 102 and perform one or more operations (where the specific information and operations can vary depending on the specific implementation). In this example, the processing device 108 can receive images from the imaging sensor(s) 106 of the imaging system 104 and process the images. For instance, the processing device 108 can analyze the images captured by the forward-facing imaging sensor(s) 106 of the imaging system 104 in order to detect lane marking lines, other vehicles, or other objects near the vehicle 102. The processing device 108 can use this information to estimate distances to the lane marking lines, other vehicles, or other objects near the vehicle 102, and the estimated distances can be used in any suitable manner. The processing device 108 can also support the techniques described below to identify one or more extrinsic calibration parameters associated with the forward-facing imaging sensor(s) 106, which helps in the calibration of the forward-facing imaging sensor(s) 106. Optionally, the processing device 108 can further process images captured by the driver-facing imaging sensor(s) 106, such as to identify any indicators or instances of the vehicle's driver becoming drowsy or otherwise being inattentive. The processing device 108 includes any suitable number(s) and type(s) of processors or other processing devices in any suitable arrangement. Example types of processing devices 108 include one or more microprocessors, microcontrollers, digital signal processors (DSPs), application specific integrated circuits (ASICs), field programmable gate arrays (FPGAs), or discrete circuitry.

The processing device 108 here is coupled to at least one memory 110, which can store any suitable instructions and data used, generated, or collected by the processing device 108. The memory 110 represents any suitable structure(s) capable of storing and facilitating retrieval of information, such as data, program code, and/or other suitable information on a temporary or permanent basis. For example, the memory 110 may represent at least one random access memory, read only memory, hard drive, Flash memory, optical disc, or any other suitable volatile or non-volatile storage device(s).

In this example, the processing device 108 is coupled to or can interact with one or more indicators 112, which may represent at least one audible, visual, tactile, or other indicator of the vehicle 102. In response to identifying that a specified condition exists, the processing device 108 may trigger at least one indicator 112 in order to notify the driver of the vehicle 102 of the specified condition. For example, if the processing device 108 detects that the vehicle 102 is crossing a lane marking line while a turn signal indicator (blinker) of the vehicle 102 is not activated, the processing device 108 may trigger an indicator 112 informing the driver of the lane departure. If the processing device 108 detects that the vehicle 102 is approaching another vehicle or other object at a high rate of speed, the processing device 108 may trigger an indicator 112 informing the driver of the potential collision. Note that the specified conditions sensed by the processing device 108 can vary and that the type(s) of indicator(s) 112 triggered by the processing device 108 can vary based on a number of factors.

The processing device 108 here can also communicate via at least one communication interface 114. The communication interface 114 may allow, for example, the processing device 108 to communicate with other components of the vehicle 102 itself, such as sensors, internal communication buses, engine components, or other components of the vehicle 102. The communication interface 114 may also or alternatively allow the processing device 108 to communicate with one or more external components outside the vehicle 102, such as one or more databases or analysis systems that store or process information from the vehicle 102. As a particular example, the processing device 108 may identify instances that are indicative of inattentiveness of the driver of the vehicle 102, and the processing device 108 may communicate information identifying or related to those instances of inattentiveness (such as timestamps, vehicle actions, driver actions, etc.) to an external system for processing or storage.

Although FIG. 1 illustrates one example of a system 100 supporting highly-accurate and self-adjusting imaging sensor auto-calibration for an in-vehicle ADAS system or other system, various changes may be made to FIG. 1. For example, various components shown in FIG. 1 may be combined, further subdivided, replicated, omitted, or rearranged and additional components may be added according to particular needs. Also, as noted above, the system 100 may involve the use of any other suitable type of vehicle 102. In addition, the use of the driver-facing imaging sensor(s) 106 and the identification of driver inattentiveness are optional here.

Figure 2:
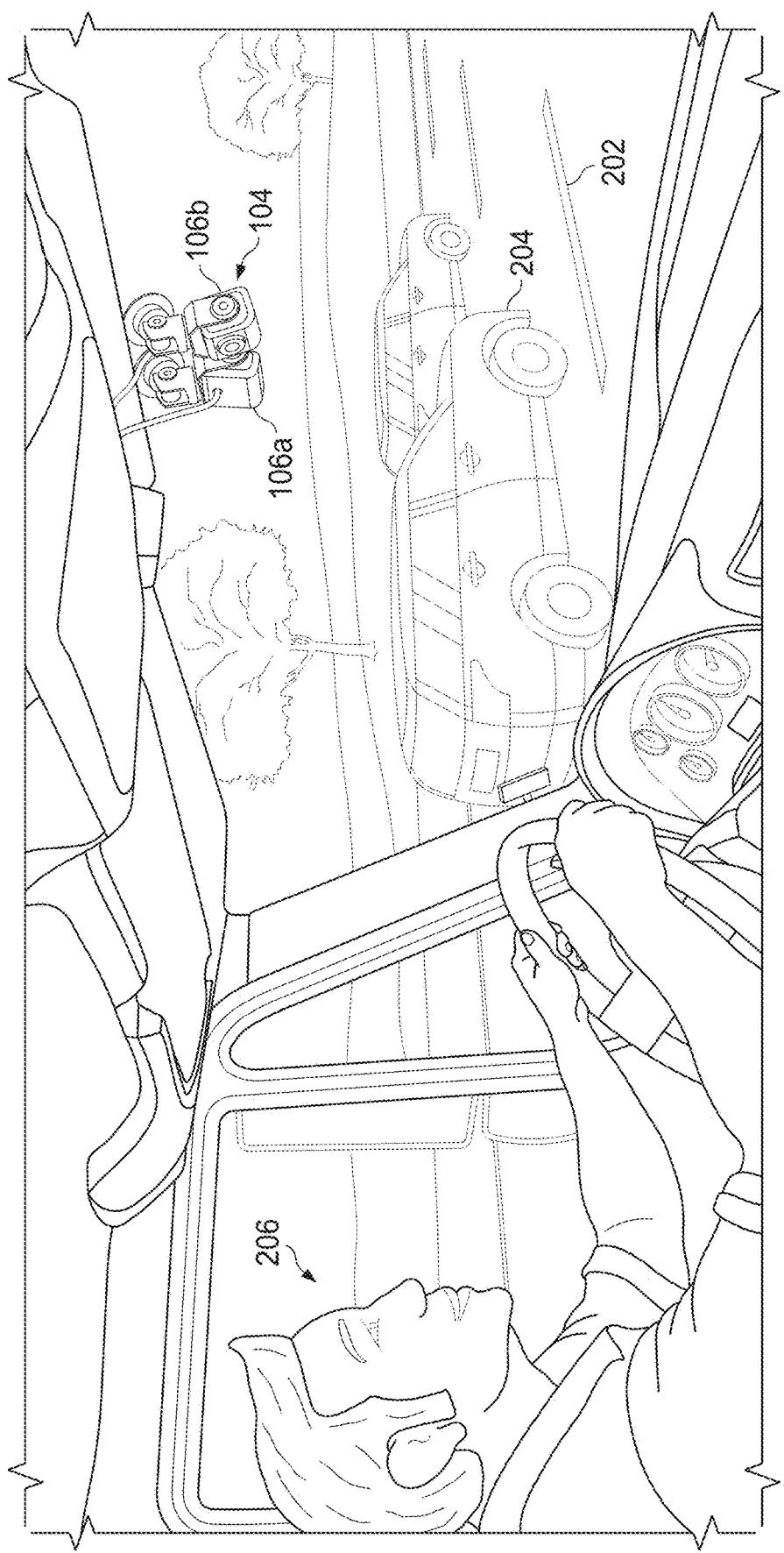
FIG. 2 illustrates an example arrangement of imaging sensors for use in an in-vehicle ADAS system or other system according to this disclosure.

FIG. 2 illustrates an example arrangement of imaging sensors 106 for use in an in-vehicle ADAS system or other system according to this disclosure. In this example, the imaging system 104 for the vehicle 102 is shown as being mounted to the interior surface of the front windshield of the vehicle 102, although the actual position of the imaging system 104 can vary from the position shown here. Note that any suitable mechanism may be used here to mount the imaging system 104 to the front windshield of the vehicle 102. Also note that any suitable mechanism may be used to facilitate communications between the imaging system 104 and the processing device 108 or other component(s), such as physical or wireless communications.

In this particular example, the imaging system 104 includes at least one forward-facing imaging sensor 106a and at least one driver-facing imaging sensor 106b. The at least one forward-facing imaging sensor 106a can be used to capture images or other image-related data associated with scenes in front of the vehicle 102. In the example shown in FIG. 2, for instance, the at least one forward-facing imaging sensor 106a may capture images of the traffic lane occupied by the vehicle 102 and possibly one or more adjacent traffic lanes. Here, the images may include lane marking lines 202 associated with the traffic lane(s) and other vehicles 204. In some embodiments, the imaging system 104 can be installed such that images captured by the forward-facing imaging sensor 106a contain a generally horizontal horizon and primarily capture the road or other surface ahead of the vehicle 102 while containing some lesser amount of sky, mountains, or other background. In particular embodiments, for example, the forward-facing imaging sensor 106a may capture images in which the upper quarter to upper third of the images contain sky, mountains, or other background. However, this is for illustration only, and any individual image can vary based on (among other things) the slope of the road or other surface on which the vehicle 102 is traveling.

The at least one driver-facing imaging sensor 106b is optional in the vehicle 102 and may be used to capture images or other image-related data associated with a driver 206 of the vehicle 102. The processing device 108 may process the images or other data from the at least one driver-facing imaging sensor 106b in order to estimate a measure of the attentiveness or inattentiveness of the driver 206. For example, the processing device 108 may support the use of the SMARTSENSE FOR INATTENTIVE DRIVING technology from OMNITRACS, LLC in order to detect and quantify driver inattentiveness.

As described above, the actual location of the forward-facing imaging sensor 106a on the vehicle 102 and the orientation of the forward-facing imaging sensor 106a on the vehicle 102 (such as its pitch and yaw angles) impact how distances to objects like lane marking lines 202 and other vehicles 204 from the vehicle 102 are calculated. Inaccurate extrinsic calibration parameters associated with the forward-facing imaging sensor 106a may therefore lead to inaccurate distance estimations to objects like the lane marking lines 202 and the other vehicles 204. This may lead to false triggers of one or more indicators 112, inaccurate measurements of the attentiveness of the driver 206, or other issues. The processing device 108 can therefore use the calibration process described below to help identify extrinsic calibration parameters associated with the forward-facing imaging sensor 106a. The extrinsic calibration parameters can include or be based on the pitch angle and the yaw angle of the forward-facing imaging sensor 106a, which can be used in other calculations (such as to identify the distances to objects like the lane marking lines 202 and the other vehicles 204). The calibration process described below can be extremely accurate, such as accurate to within one tenth of a degree or less for both the pitch angle and the yaw angle of the forward-facing imaging sensor 106a. Moreover, the calibration process can be repeated as needed or desired.

Although FIG. 2 illustrates one example of an arrangement of imaging sensors 106a-106b for use in an in-vehicle ADAS system or other system, various changes may be made to FIG. 2. For example, the actual position(s) of the imaging sensors 106a-106b in the vehicle 102 may vary from the positions that are shown here. Also, the imaging sensors 106a-106b may have any other suitable form factor. In addition, while both forward-facing and driver-facing imaging sensors 106a-106b are shown here, the driver-facing imaging sensor(s) 106b may be omitted if desired.

Figure 3A:
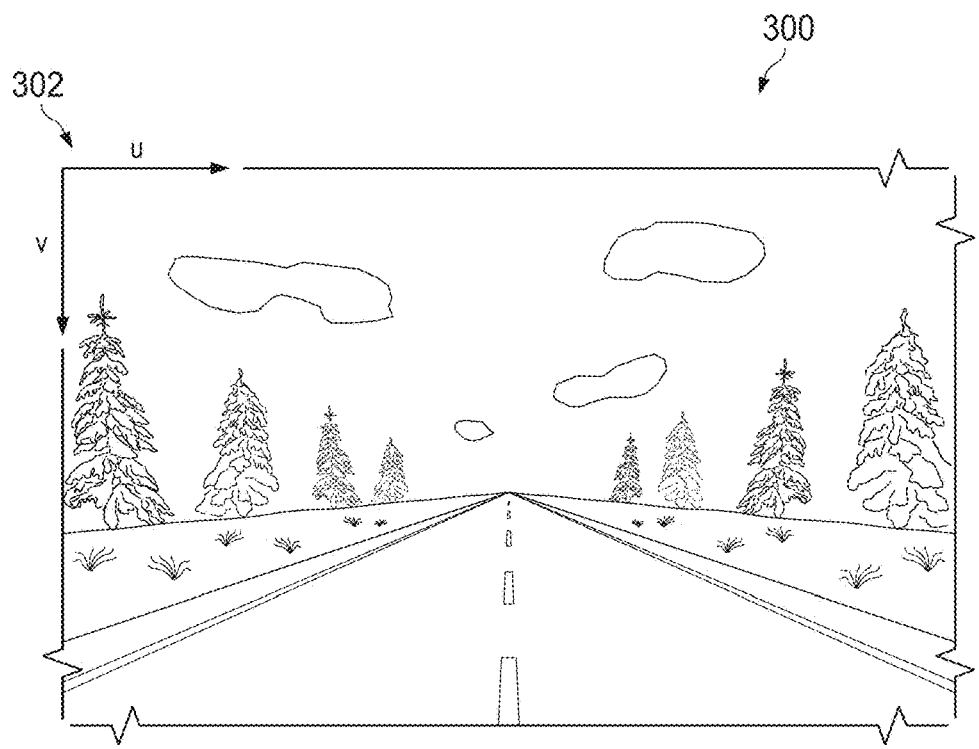
FIGS. 3A and 3B illustrate example coordinate systems associated with in an in-vehicle ADAS system or other system according to this disclosure.
Figure 3B:
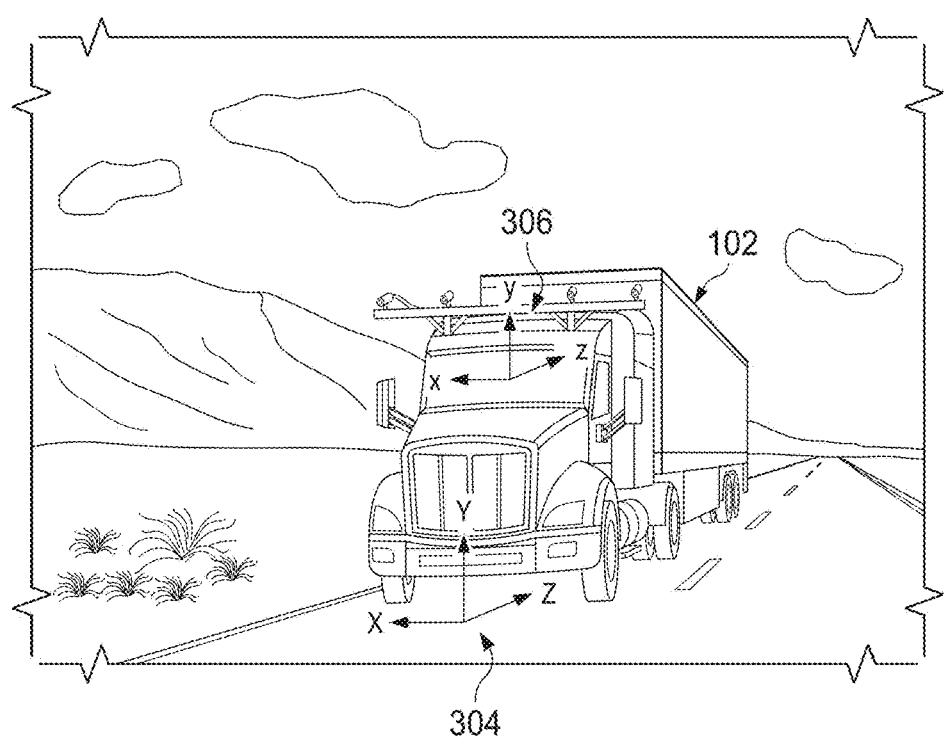

FIGS. 3A and 3B illustrate example coordinate systems associated with in an in-vehicle ADAS system or other system according to this disclosure. As shown in FIG. 3A, an image 300 of a scene is shown and may represent an image captured using the forward-facing imaging sensor(s) 106a of the vehicle 102. The image 300 here is associated with a coordinate system 302, which includes a horizontal axis (denoted the u axis) and a vertical axis (denoted the v axis). In this example, the coordinate system 302 has an origin at the upper left corner of the image 300, although this is for illustration only. Each pixel within the image 300 may therefore be defined as having a discrete position using an integer-valued tuple (u, v).

The vehicle 102 itself is associated with a coordinate system 304, which includes a horizontal axis (denoted the X axis) extending across the width of the vehicle 102, a vertical axis (denoted the Y axis) extending across the height of the vehicle 102, and a horizontal axis (denoted the Z axis) extending along the length of the vehicle 102. Here, coordinates of lane marking lines, other vehicles, or other objects around the vehicle 102 may be expressed using a continuous-valued tuple (X, Y, Z) (where X, Y, Z ∈ Each of the (X, Y, Z) tuples corresponds to a location in three-dimensional (3D) world coordinates, where the origin of the coordinate system 304 is located at the center of the vehicle's front bumper at ground level. The orientation of the coordinate system 304 is such that the X-Z plane lies in a plane of the (assumed flat) road.

The forward-facing imaging sensor 106a of the vehicle 102 has a similar coordinate system 306 with x, y, and z axes. In the coordinate system 306, coordinates of lane marking lines, other vehicles, or other objects around the vehicle 102 may be expressed using a continuous-valued tuple (x, y, z) (where x, y, z∈R). Each of the (x, y, z) tuples corresponds to a location in 3D world coordinates, where the origin of the coordinate system 306 is located at the center of the forward-facing imaging sensor 106a (which may be considered to function as a pinhole camera). The x axis of the coordinate system 306 extends in the same direction as the u axis of the coordinate system 302, and the y axis of the coordinate system 306 extends in the same direction as the −v axis of the coordinate system 302. It should be noted here that the forward-facing imaging sensor 106a may not actually represent a pinhole camera since it can include a lens that focuses light onto a sensor. However, treating the forward-facing imaging sensor 106a as if it is a pinhole camera can be justified since the distance between the lens and the sensor in the forward-facing imaging sensor 106a is much smaller than the distance between the lens and an object far away from the forward-facing imaging sensor 106a being viewed (this is called "pinhole approximation").

In general, effectively determining the distance between the vehicle 102 and lane marking lines, other vehicles, or other objects depends on an accurate transformation between the coordinate system 306 and the coordinate system 304. However, there may be both translational and rotational differences between the coordinate systems 304 and 306 themselves. Even if attempts are made to ensure that the forward-facing imaging sensor 106a is installed on the vehicle 102 with as little rotational offset as possible between its coordinate system 306 and the vehicle's coordinate system 304, some rotational differences typically still exist after installation of the forward-facing imaging sensor 106a. Accurate knowledge of how the coordinate system 306 of the forward-facing imaging sensor 106a is offset in terms of both translation distances and rotational angles relative to the coordinate system 304 of the vehicle 102 may be necessary or desirable to calculate distances from the vehicle 102 to other objects or to perform other functions. The calibration process described below helps to identify the extrinsic calibration parameters needed for transformations between the coordinate systems 304 and 306.

In the discussion below, the following nomenclature is used. The terms $T_x$, $T_y$, and $T_z$ refer to translational distances from the origin of the coordinate system 306 to the origin of the coordinate system 304 along the x, y, and z axes. The terms $R_x$, $R_y$, and $R_z$ refer to rotations about the x, y, and z axes needed to transform coordinates from the coordinate system 306 to the coordinate system 304. The calibration process described below can be used to identify at least values for $R_x$ (which identifies the pitch of the forward-facing imaging sensor 106a) and $R_y$ (which identifies the yaw of the forward-facing imaging sensor 106a). Distance estimates involving the vehicle 102 may be most sensitive to these two extrinsic calibration parameters, so more accurate estimates of the $R_x$ and $R_y$ values may have the largest impact on the accuracy of the distance measurements. Note that, in some cases, it may be assumed that $R_z$=0, which can simplify distance calculations while having minimal impact on the accuracy of the distance calculations. This is because rotating the forward-facing imaging sensor 106a about its z axis can have far less impact on the distance calculations compared to rotating the forward-facing imaging sensor 106a about its x and y axes. However, in other cases, the value of $R_z$ may be determined and used during distance calculations.

As described below, the calibration process can use manual or other measurements identifying distances of the forward-facing imaging sensor 106a from one or more specified points or axes of the vehicle 102. These measurements can be used to define the $T_x$, $T_y$, and $T_z$ translational distances between the origins of the coordinate systems 304 and 306. Note that these measurements may or may not have high accuracy. In some cases, for example, the calibration process may operate effectively even when the translational distances $T_x$, $T_y$, and $T_z$ have an accuracy of one or several inches. In some cases, the $T_y$ translational distance may only need to be accurate to within about six inches. The calibration process can also process images captured by the forward-facing imaging sensor 106a while the vehicle 102 is being driven. The processing device 108 may analyze the images as described below to identify images in which multiple lane marking lines can be identified and used to calculate the locations of vanishing points in the images. The locations of the vanishing points can be averaged, and the average position of the vanishing points in the images can be used to calculate the $R_x$ and $R_y$ rotational values. The extrinsic calibration parameters of the forward-facing imaging sensor 106a (such as $T_x$, $T_y$, $T_z$, $R_x$, $R_y$, and $R_z$) can then be used in various other computations, such as to estimate distances from the vehicle 102 to lane marking lines, other vehicles, or other objects in 3D space based on two-dimensional (2D) images captured by the forward-facing imaging sensor 106a.

Although FIGS. 3A and 3B illustrate examples of coordinate systems 302, 304, and 306 associated with in an in-vehicle ADAS system or other system, various changes may be made to FIGS. 3A and 3B. For example, the forward-facing imaging sensor 106a may be positioned elsewhere on the vehicle 102, so there may be different translational distances between the origins of the coordinate systems 304 and 306. Also, the coordinate system 306 of the forward-facing imaging sensor 106a can vary based on the orientation of the forward-facing imaging sensor 106a on the vehicle 102, so there may be different rotational angles between the coordinate systems 304 and 306.

Figure 4A:
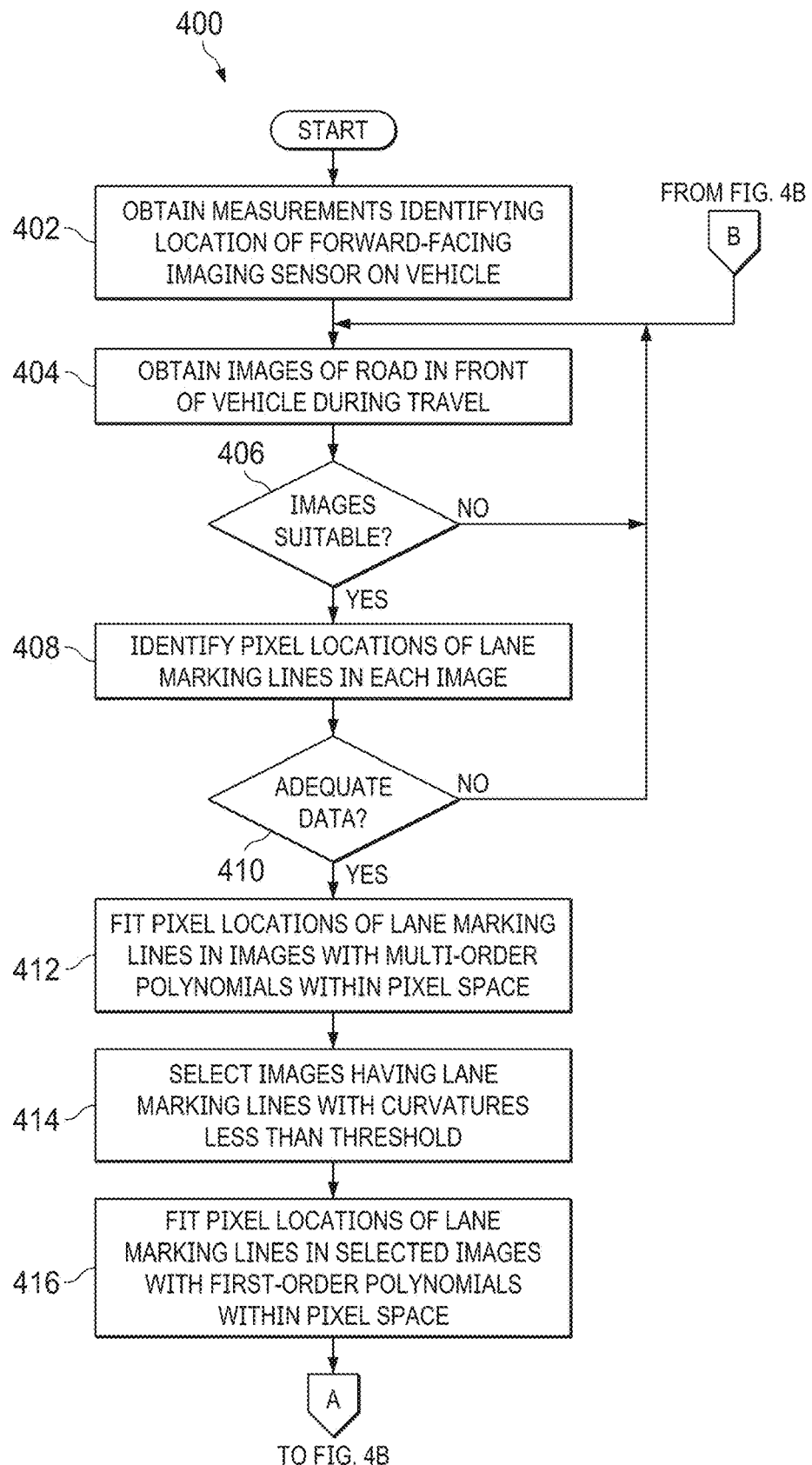
FIGS. 4A and 4B illustrate an example method for performing highly-accurate and self-adjusting imaging sensor auto-calibration for an in-vehicle ADAS system or other system according to this disclosure.
Figure 4B:
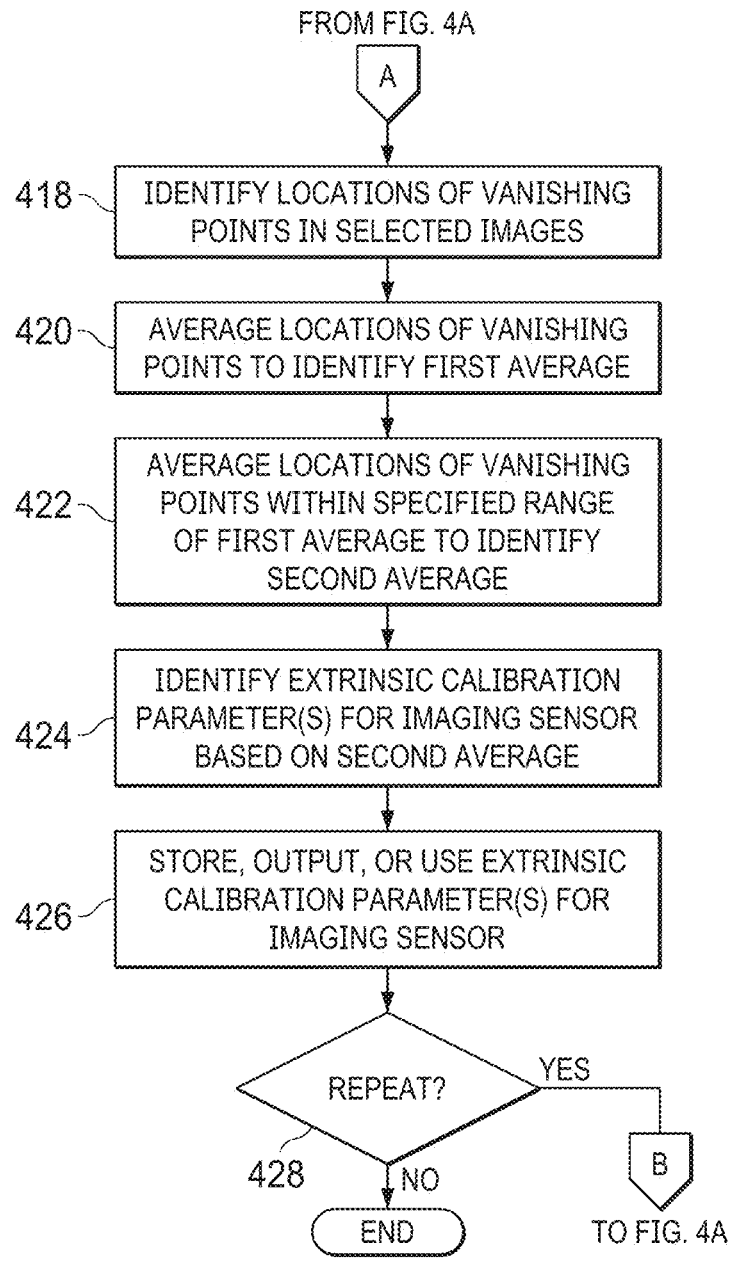

FIGS. 4A and 4B illustrate an example method 400 for performing highly-accurate and self-adjusting imaging sensor auto-calibration for an in-vehicle ADAS system or other system according to this disclosure. For ease of explanation, the method 400 is described as being performed using the forward-facing imaging sensor 106a and the processing device 108 in the vehicle 102 of FIG. 1. However, the method 400 may be performed using any other suitable device(s) and in any other suitable vehicle(s).

As shown in FIGS. 4A and 4B, measurements identifying a location of a forward-facing imaging sensor on a vehicle are obtained at step 402. This may include, for example, the processing device 108 receiving manual or other measurements identifying the position of the forward-facing imaging sensor 106a on the vehicle 102 relative to one or more specified points or axes of the vehicle 102. In some cases, for instance, the measurements may include a measure of the horizontal distance from the front of the vehicle's bumper to the location of the forward-facing imaging sensor 106a (which represents the $T_z$, translational distance), a measure of the vertical distance from the ground to the location of the forward-facing imaging sensor 106a (which represents the $T_y$, translational distance), and a measure of the horizontal distance from a centerline of the vehicle 102 to the location of the forward-facing imaging sensor 106a (which represents the $T_x$ translational distance). Note that other measurements of the vehicle 102 itself might also be obtained here, such as a measure of the total horizontal width of the vehicle 102 (like a measure of outside bumper-to-outside bumper distance or a measure of outside tire-to-outside tire distance of the vehicle 102).

Images of the road or other surface in front of the vehicle are obtained during travel of the vehicle at step 404. This may include, for example, the processing device 108 obtaining multiple images captured by the forward-facing imaging sensor 106a during a time period when the vehicle 102 is being driven. Depending on the implementation, this may involve the collection of a large number of images, such as one thousand images or more. In some cases, the vehicle 102 may be driven at a relatively high rate of speed during the image capture, and the road on which the vehicle 102 is being driven may be relatively straight. In particular embodiments, for instance, the vehicle 102 may be driven at a speed of at least about 45 miles per hour (about 72.4 kilometers per hour). However, the vehicle 102 may be driven at faster or slower speeds as needed or desired. Also, in some cases, the forward-facing imaging sensor 106a may capture the images in rapid succession, such as when the images are captured by the forward-facing imaging sensor 106a at a rate of fifteen frames per second or some other rate. A determination is made whether the obtained images are suitable for further processing at step 406. This may include, for example, the processing device 108 determining whether at least a threshold number of images that contain two lane marking lines and that have a suitable image quality have been obtained. If not, the process returns to step 404 to obtain additional images.

Otherwise, for each of at least some of the obtained images, pixel locations of lane marking lines in the image are identified at step 408. This may include, for example, the processing device 108 performing object recognition or other image processing operations to identify lane marking lines in the obtained images. The pixel locations of the lane marking lines may be saved in memory (such as the memory 110) for further processing. A determination is made whether enough data has been collected at step 410. This may include, for example, the processing device 108 determining whether at least a threshold number of images with identifiable lane marking lines have been identified. If not, the process returns to step 404 to obtain and process additional images. In some cases, the lane marking lines that are identified in the images may each have an associated confidence level, where the confidence level identifies the strength of (or the level of confidence in) the identified pixel locations of that lane marking line. In those cases, step 410 may involve determining whether at least a threshold number of images with identifiable lane marking lines having a minimum confidence level (such as at least an 80% confidence) have been identified.

For at least some of the images in which the pixel locations of the lane marking lines are identified, the pixel locations of the lane marking lines are fit to multi-order polynomials within pixel space at step 412. This may include, for example, the processing device 108 using a curve-fitting algorithm or other logic to fit a second-order polynomial or other multi-order polynomial to the pixel locations of each lane marking line in each image being processed. Each multi-order polynomial identifies the approximate path of the associated lane marking line in the image containing that lane marking line. Images having multi-order polynomials with less than a threshold amount of curvature are selected at step 414. This may include, for example, the processing device 108 excluding images having lane marking lines with multi-order polynomials that diverge from straight lines by more than a specified amount or percentage. For those selected images, the pixel locations of the lane marking lines are fit to first-order polynomials (straight lines) within the pixel space at step 416. This may include, for example, the processing device 108 using a curve-fitting algorithm or other logic to fit a first-order polynomial to the pixel locations of each lane marking line in each selected image. Each first-order polynomial identifies the approximate path of the associated lane marking line in the selected image containing that lane marking line.

Figure 5:
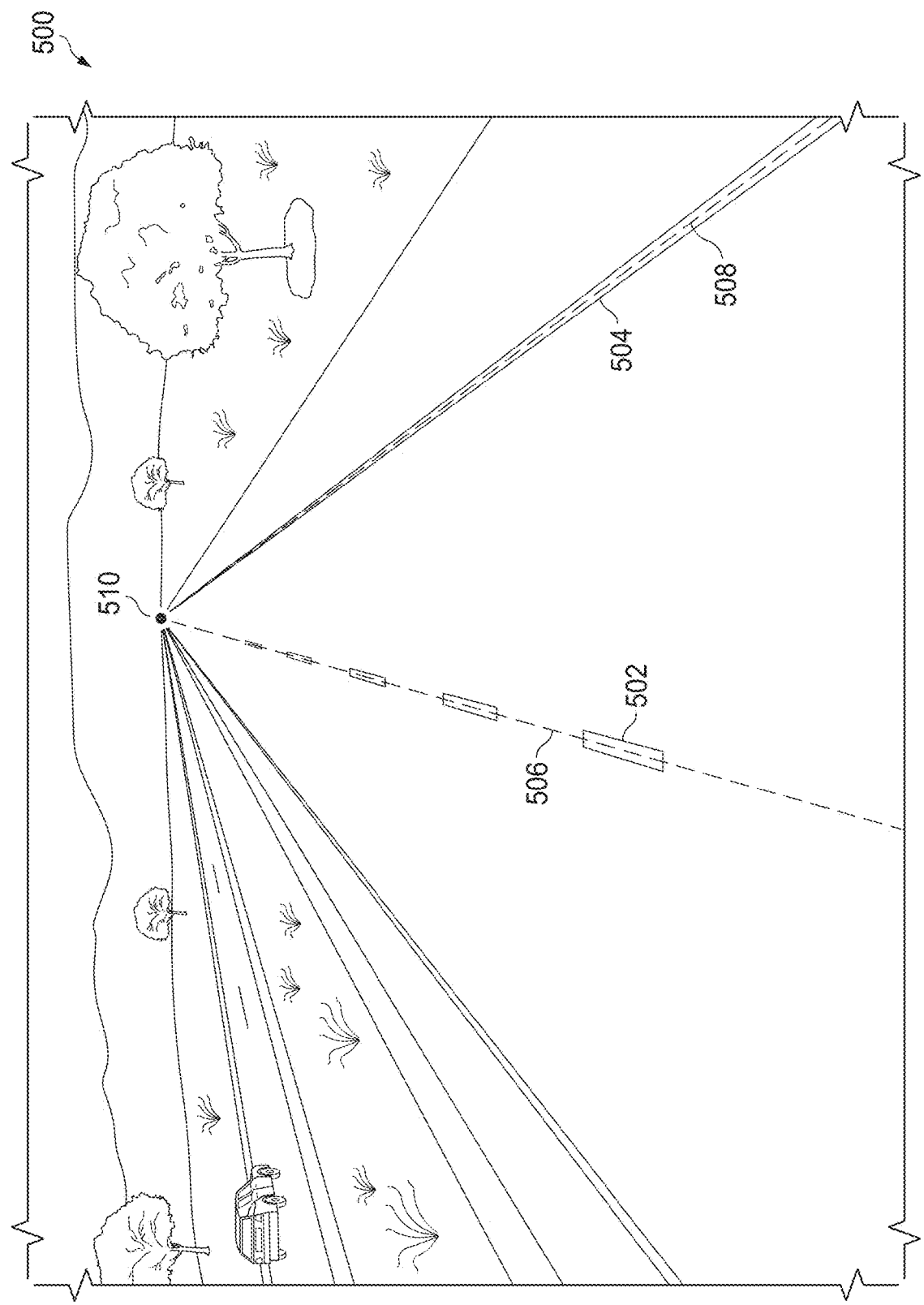
FIG. 5 illustrates example processing results for an image captured by an imaging sensor in an in-vehicle ADAS system or other system according to this disclosure.

Vanishing points in the selected images are identified based on the first-order polynomials for the lane marking lines in those selected images at step 418. This may include, for example, the processing device 108 identifying the vanishing point in each selected image as the pixel where the first-order polynomials for the lane marking lines in that selected image intersect. One example of this is shown in FIG. 5, which illustrates example processing results for an image 500 captured by an imaging sensor 106a in an in-vehicle ADAS system or other system according to this disclosure. As shown in FIG. 5, the image 500 captures a scene with two lane marking lines 502 and 504. The processing device 108 has identified first-order polynomials 506 and 508 for these lane marking lines 502 and 504. The processing device 108 can then determine a vanishing point 510 as the pixel at which the first-order polynomials 506 and 508 intersect one another in the image 500.

The locations of the vanishing points determined for the selected images are averaged. In this example, the averaging is performed as a two-step process. First, the locations of the vanishing points determined for all of the selected images are averaged to produce a first average at step 420. This may include, for example, the processing device 108 averaging the (u, v) coordinates of the identified vanishing points in the selected images to identify a first average of the (u, v) coordinates. The first average may be said to represent a rough estimate of the average position of the vanishing points in the selected images. Second, the locations of the vanishing points identified as being within some threshold range of the first average are averaged to produce a second average at step 422. This may include, for example, the processing device 108 averaging the (u, v) coordinates of the identified vanishing points in the selected images that are within a twenty-pixel circle (or other area) around the first average to identify a second average of these (u, v) coordinates. This average may represent a more precise estimate of the average position of the vanishing points in the selected images. This type of averaging may be done to exclude outliers that are not within a specified distance of the rough estimate of the average vanishing point. Note, however, that an average vanishing point may be determined in any other suitable manner.

One or more extrinsic calibration parameters associated with the forward-facing imaging sensor are identified based on the average position of the vanishing points at step 424. This may include, for example, the processing device 108 using the average position of the vanishing points and one or more intrinsic calibration parameters of the forward-facing imaging sensor 106a (such as its focal lengths and sensor centers) to calculate pitch and yaw angles of the forward-facing imaging sensor 106a. Example calculations that may be used to identify the pitch and yaw angles of the forward-facing imaging sensor 106a are described below. However, the one or more extrinsic calibration parameters of the forward-facing imaging sensor 106a may be determined in any other suitable manner. Note that the intrinsic calibration parameters of the forward-facing imaging sensor 106a here may represent universal constants.

The one or more extrinsic calibration parameters of the forward-facing imaging sensor are stored, output, or used in some manner at step 426. This may include, for example, the processing device 108 receiving additional images from the forward-facing imaging sensor 106a during travel of the vehicle 102 and using the pitch and yaw angles of the forward-facing imaging sensor 106a to identify distances to lane marking lines, other vehicles, or other objects around the vehicle 102. This may also include the processing device 108 triggering one or more indicators 112 in response to one or more detected conditions, such as when the processing device 108 detects that the vehicle 102 is crossing a lane marking line while a turn signal indicator of the vehicle 102 is not activated or that the vehicle 102 may impact another vehicle or other object. This may further include the processing device 108 identifying an instance of driver inattentiveness in response to detecting that the vehicle 102 is crossing a lane marking line while the turn signal indicator of the vehicle 102 is not activated or in response to detecting some other condition associated with driver attentiveness.

A determination is made whether to repeat this process at step 428. If so, the process returns to step 404 to collect additional images for processing. Note that the process may instead return to a different step, such as when the process returns to step 402 in order to obtain more accurate measurements of the location of the forward-facing imaging sensor 106a on the vehicle 102. The process can be repeated based on any suitable criteria, such as in response to the passage of a specified amount of time or in response to excessive false triggering of one or more indicators 112.

Although FIGS. 4A and 4B illustrate one example of a method 400 for performing highly-accurate and self-adjusting imaging sensor auto-calibration for an in-vehicle ADAS system or other system, various changes may be made to FIGS. 4A and 4B. For example, while shown as a series of steps, various steps in FIGS. 4A and 4B may overlap, occur in parallel, occur in a different order, or occur any number of times. Although FIG. 5 illustrates examples of processing results for an image 500 captured by an imaging sensor 106a in an in-vehicle ADAS system or other system, various changes may be made to FIG. 5. For instance, images of scenes in front of the vehicle 102 may vary widely, and the contents of the images that are obtained and processed may similarly vary widely.

Note that various functions described above as being performed in or by the vehicle 102 may be implemented in any suitable manner in the system 100. For example, in some embodiments, various functions described above as being performed in or by the vehicle 102 may be implemented or supported using one or more software applications or other software/firmware instructions that are executed by at least one processor or other processing device. In other embodiments, at least some of the functions described above as being performed in or by the vehicle 102 can be implemented or supported using dedicated hardware components. In general, the functions described above as being performed in or by the vehicle 102 may be performed using any suitable hardware or any suitable combination of hardware and software/firmware instructions. Any suitable hardware may also be used here, such as one or more microprocessors, microcontrollers, DSPs, ASICs, FPGAs, or discrete circuitry.

As described above, once the pitch and yaw angles ($R_x$ and $R_y$ values) associated with the forward-facing imaging sensor 106a are identified, these values can be used to perform transformations between different coordinate systems. For example, the pitch and yaw angles can be used to process image data expressed within the coordinate system 302 (which is captured using the forward-facing imaging sensor 106a having the coordinate system 306) and identify distances or other measurements within the vehicle's coordinate system 304. As noted above with reference to FIGS. 3A and 3B, the extrinsic calibration parameters that are identified for the forward-facing imaging sensor 106a include three translation distances ($T_x$, $T_y$, and $T_z$) and three rotation angles ($R_x$, $R_y$, and $R_z$). These variables parameterize the transformation between the (x, y, z) coordinate system 306 of the forward-facing imaging sensor 106a and the (X, Y, Z) coordinate system 304 of the vehicle 102. In some embodiments, the relationship between these coordinate systems 304 and 306 may be expressed using homogeneous coordinates as follows.

$$\begin{pmatrix} x \\ y \\ z \end{pmatrix} = \begin{pmatrix} 1 & 0 & 0 & T_x \\ 0 & 1 & 0 & T_y \\ 0 & 0 & 1 & T_z \end{pmatrix} \begin{pmatrix} 1 & 0 & 0 & 0 \\ 0 & \cos R_x & \sin R_x & 0 \\ 0 & -\sin R_x & \cos R_x & 0 \\ 0 & 0 & 0 & 1 \end{pmatrix} \begin{pmatrix} \cos R_y & 0 & -\sin R_y & 0 \\ 0 & 1 & 0 & 0 \\ \sin R_y & 0 & \cos R_y & 0 \\ 0 & 0 & 0 & 1 \end{pmatrix} \begin{pmatrix} X \\ Y \\ Z \\ 1 \end{pmatrix} \quad (1)$$

Note that the rotations here are passive transformations and that it is explicitly assumed $R_z=0$ (meaning the roll of the forward-facing imaging sensor 106a is zero), which as noted above can have a minimal effect on estimating distances to objects.

The intrinsic calibration parameters for the forward-facing imaging sensor 106a may include four parameters that describe the geometry of a camera with a mostly-spherical lens. More specifically, the intrinsic calibration parameters for the forward-facing imaging sensor 106a may include two focal lengths ($f_x$ and $f_y$) and two focal centers ($c_x$ and $c_y$). Using these parameters, it is possible to transform image data between an image's coordinate system 302 and the (x, y, z) coordinate system 306. For example, projective geometry (which involves a transformation called a "homography" in computer vision) may be used and can be expressed as follows.

$$(-z)\begin{pmatrix} u \\ v \\ 1 \end{pmatrix} = \begin{pmatrix} f_x & 0 & c_x \\ 0 & f_y & c_y \\ 0 & 0 & 1 \end{pmatrix} \begin{pmatrix} 1 & 0 & 0 \\ 0 & -1 & 0 \\ 0 & 0 & -1 \end{pmatrix} \begin{pmatrix} x \\ y \\ z \end{pmatrix} \quad (2)$$

In Equation (2), the tuple (x, y, z) represents the same tuple used in Equation (1).

Within the coordinate system 304, the location of an infinite distance ahead in (X, Y, Z) coordinates can be defined by taking any point (X, Y, Z) and determining the limit as $Z \to \infty$. At this vanishing point, the homography has a very simple expression, which can be defined as follows.

$$u^* = c_x + f_x \sec(R_y)\tan(R_y) \quad (3)$$

$$v^* = c_y + f_y \sec(R_y)\sin(R_x) \quad (4)$$

Here, the position (u*, v*) represents the location of the vanishing point in an image. Note that there is no dependence on the $T_x$, $T_y$, $T_z$, X, and Y values here in the expressions for u* and v*. Equations (3) and (4) can be inverted and solved analytically as follows.

$$R_x = \arcsin\left[\frac{\beta}{f_y}\sqrt{\frac{f_x\gamma}{2\alpha^2}}\right] \quad (5)$$

$$R_y = \arctan\left[\sqrt{\frac{2f_x\gamma}{\alpha^2}}, -\frac{\gamma}{\alpha}\right] \quad (6)$$

In Equations (5) and (6):

$$\alpha = u^* - c_x \quad (7)$$

$$\beta = v^* - c_y \quad (8)$$

$$\gamma = -f_x + \sqrt{f_x^2 + 4\alpha^2} \quad (9)$$

Note that the values of $R_x$ and $R_y$ from these equations will be in radians (not degrees) but can easily be converted. Also note that the arctan function here has the form arctan(x, y), which identifies the angle between the positive x axis and a point (x, y) in Cartesian coordinates.

It is therefore possible, using the equations above, to identify the $R_x$ and $R_y$ extrinsic calibration parameters of the forward-facing imaging sensor 106a based on (i) the intrinsic calibration parameters of the forward-facing imaging sensor 106a and (ii) the (u*, v*) location of the vanishing point. Thus, the calibration process described above may be used when a vehicle 102 is traveling, such as on a generally straight road, where the lane marking lines for the road are generally parallel and point straight ahead. When capturing an image of such lane marking lines, it is possible to extrapolate these lane marking lines to an infinite distance ahead, where the lane marking lines intersect at the vanishing point of the image. The location of the vanishing point in the image can be used to solve for $R_x$ and $R_y$ given prior knowledge of $f_x$, $f_y$, $c_x$, and $c_y$ (and assuming $R_z=0$).

In some cases, the following operations can be performed as part of the calibration process described above with respect to FIGS. 4A and 4B. Images showing two (high confidence) lane marking lines can be obtained, which ideally may include images showing minimal road curvature and with the lane marking lines extending out in front of the vehicle. These lane marking lines can be identified, and polynomials can be identified for at least some of the lane marking lines. For each of at least some of the images, the intersection of the polynomials representing the lane marking lines in that image is identified as the vanishing point (u*, v*) for that image. The locations of the vanishing points in multiple images can be averaged (such as by using the two-step approach described above or another suitable approach), and the average position of the vanishing point can be used in Equations (5) and (6) above. This allows for the identification of the extrinsic calibration parameters $R_x$ and $R_y$ for the forward-facing imaging sensor 106a. At that point, the extrinsic calibration parameters can be stored and used during normal operation of the system 100.

As described above, the identification of the one or more extrinsic calibration parameters of the imaging sensor 106a can be repeated periodically or at any other suitable times. For example, during the method 400, the measurements identifying the location of the imaging sensor 106a on the vehicle 102 may be obtained at step 402. Assuming the imaging sensor 106a is fixed in its location on the vehicle 102 (such as on the windshield of the vehicle 102), there may be no need to repeat these measurements during subsequent recalibrations of the imaging sensor 106a. As a result, the one or more extrinsic calibration parameters of the imaging sensor 106a can be updated over time by capturing images in front of the vehicle 102 and determining updated $R_x$ and $R_y$ values based on those images. This might be repeated daily, for instance, in order to keep the overall system accurate in case the imaging sensor 106a moves slightly. Movement of the imaging sensor 106a might be possible, for example, due to shifting of the adhesive contacting the windshield of the vehicle 102 or shifting of the imaging sensor 106a. However, if the windshield of the vehicle 102 is replaced, the imaging sensor 106a would typically be reinstalled on the new windshield. In that case, the measurements at step 402 may be repeated to identify the current location of the imaging sensor 106a on the vehicle 102, and additional images can be captured and used to determine updated $R_x$ and $R_y$ values based on those images.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining measurements associated with a position of an imaging sensor on a vehicle, at least some of the measurements identifying the position of the imaging sensor relative to at least one of: one or more specified locations of the vehicle and one or more specified axes of the vehicle;
obtaining multiple images of a scene using the imaging sensor, the images of the scene capturing lane marking lines associated with a traffic lane in which the vehicle is traveling;
identifying, in each of at least some of the images, a vanishing point based on the lane marking lines captured in the image;
identifying an average position of the vanishing points in the at least some of the images; and
determining one or more extrinsic calibration parameters of the imaging sensor based on the average position of the vanishing points and the measurements associated with the position of the imaging sensor on the vehicle.

2. The method of claim 1, wherein identifying, in each of at least some of the images, the vanishing point based on the lane marking lines captured in the image comprises:
identifying pixel locations of the lane marking lines in each of the images;
fitting multi-order polynomials to the pixel locations of the lane marking lines in each of the images;
selecting images that are associated with multi-order polynomials having less than a specified amount of curvature;
fitting first-order polynomials to the pixel locations of the lane marking lines in each of the selected images; and
identifying a location in each of the selected images where the first-order polynomials for the lane marking lines in the selected image intersect.

3. The method of claim 1, wherein identifying the average position of the vanishing points in the at least some of the images comprises:
identifying a first average position of the vanishing points in the at least some of the images; and
identifying a second average position of the vanishing points in the at least some of the images that fall within a specified range of the first average position.

4. The method of claim 1, wherein the one or more extrinsic calibration parameters of the imaging sensor comprise a pitch angle and a yaw angle of the imaging sensor.

5. The method of claim 4, wherein the pitch angle and the yaw angle of the imaging sensor are determined as:

$$R_x = \arcsin\left[\frac{\beta}{f_y}\sqrt{\frac{f_x \gamma}{2\alpha^2}}\right]; \text{ and}$$

$$R_y = \arctan\left[\sqrt{\frac{2 f_x \gamma}{\alpha^2}}, -\frac{\gamma}{\alpha}\right];$$

wherein:
$R_x$ represents the pitch angle;
$R_y$ represents the yaw angle;

$\alpha = u^* - c_x$;

$\beta = v^* - c_y$;

$\gamma = -f_x + \sqrt{f_x^2 + 4\alpha^2}$;

u* and v* represent coordinates of the average position of the vanishing points;
$f_x$ and $f_y$ represent focal lengths associated with the imaging sensor; and
$c_x$ and $c_y$ represent focal centers associated with the imaging sensor.

6. The method of claim 4, wherein the measurements associated with the position of the imaging sensor on the vehicle comprise (i) a first measure of horizontal distance from a front of the vehicle's bumper to the position of the imaging sensor, (ii) a second measure of vertical distance from a ground to the position of the imaging sensor, and (iii) a third measure of horizontal distance from a centerline of the vehicle to the position of the imaging sensor.

7. The method of claim 1, further comprising:
using the one or more extrinsic calibration parameters of the imaging sensor, processing additional images from the imaging sensor and identifying one or more distances to one or more objects around the vehicle.

8. An apparatus comprising:
at least one processing device configured to:
obtain measurements associated with a position of an imaging sensor on a vehicle, at least some of the measurements identifying the position of the imaging sensor relative to at least one of: one or more specified locations of the vehicle and one or more specified axes of the vehicle;
obtain multiple images of a scene using the imaging sensor, the images of the scene capturing lane marking lines associated with a traffic lane in which the vehicle is traveling;
identify, in each of at least some of the images, a vanishing point based on the lane marking lines captured in the image;
identify an average position of the vanishing points in the at least some of the images; and
determine one or more extrinsic calibration parameters of the imaging sensor based on the average position of the vanishing points and the measurements associated with the position of the imaging sensor on the vehicle.

9. The apparatus of claim 8, wherein, to identify in each of at least some of the images the vanishing point based on the lane marking lines captured in the image, the at least one processing device is configured to:
identify pixel locations of the lane marking lines in each of the images;

fit multi-order polynomials to the pixel locations of the lane marking lines in each of the images;
select images that are associated with multi-order polynomials having less than a specified amount of curvature;
fit first-order polynomials to the pixel locations of the lane marking lines in each of the selected images; and
identify a location in each of the selected images where the first-order polynomials for the lane marking lines in the selected image intersect.

10. The apparatus of claim 8, wherein, to identify the average position of the vanishing points in the at least some of the images, the at least one processing device is configured to:
identify a first average position of the vanishing points in the at least some of the images; and
identify a second average position of the vanishing points in the at least some of the images that fall within a specified range of the first average position.

11. The apparatus of claim 8, wherein the one or more extrinsic calibration parameters of the imaging sensor comprise a pitch angle and a yaw angle of the imaging sensor.

12. The apparatus of claim 11, wherein the measurements associated with the position of the imaging sensor on the vehicle comprise (i) a first measure of horizontal distance from a front of the vehicle's bumper to the position of the imaging sensor, (ii) a second measure of vertical distance from a ground to the position of the imaging sensor, and (iii) a third measure of horizontal distance from a centerline of the vehicle to the position of the imaging sensor.

13. The apparatus of claim 8, wherein the at least one processing device is further configured to use the one or more extrinsic calibration parameters of the imaging sensor to (i) process additional images from the imaging sensor and (ii) identify one or more distances to one or more objects around the vehicle.

14. An apparatus comprising:
at least one processing device configured to:
obtain multiple images of a scene using an imaging sensor associated with a vehicle, the images of the scene capturing lane marking lines associated with a traffic lane in which the vehicle is traveling;
identify, in each of at least some of the images, a vanishing point based on the lane marking lines captured in the image;
identify an average position of the vanishing points in the at least some of the images; and
determine one or more extrinsic calibration parameters of the imaging sensor based on the average position of the vanishing points;
wherein the one or more extrinsic calibration parameters of the imaging sensor comprise a pitch angle and a yaw angle of the imaging sensor;
wherein the at least one processing device is configured to determine the pitch angle and the yaw angle of the imaging sensor as:

$$R_x = \arcsin\left[\frac{\beta}{f_y}\sqrt{\frac{f_x \gamma}{2\alpha^2}}\right]; \text{ and}$$

$$R_y = \arctan\left[\sqrt{\frac{2 f_x \gamma}{\alpha^2}}, -\frac{\gamma}{\alpha}\right];$$

wherein:
$R_x$ represents the pitch angle;
$R_y$ represents the yaw angle;

$$\alpha = u^* - c_x;$$

$$\beta = v^* - c_y;$$

$$\gamma = -f_x + \sqrt{f_x^2 + 4\alpha^2};$$

$u^*$ and $v^*$ represent coordinates of the average position of the vanishing points;
$f_x$ and $f_y$ represent focal lengths associated with the imaging sensor; and
$c_x$ and $c_y$ represent focal centers associated with the imaging sensor.

15. A non-transitory machine-readable medium containing instructions that when executed cause at least one processor to:
obtain measurements associated with a position of an imaging sensor on a vehicle, at least some of the measurements identifying the position of the imaging sensor relative to at least one of: one or more specified locations of the vehicle and one or more specified axes of the vehicle;
obtain multiple images of a scene using the imaging sensor, the images of the scene capturing lane marking lines associated with a traffic lane in which the vehicle is traveling;
identify, in each of at least some of the images, a vanishing point based on the lane marking lines captured in the image;
identify an average position of the vanishing points in the at least some of the images; and
determine one or more extrinsic calibration parameters of the imaging sensor based on the average position of the vanishing points and the measurements associated with the position of the imaging sensor on the vehicle.

16. The non-transitory machine-readable medium of claim 15, wherein the instructions that when executed cause the at least one processor to identify, in each of at least some of the images, the vanishing point based on the lane marking lines captured in the image comprise:
instructions that when executed cause the at least one processor to:
identify pixel locations of the lane marking lines in each of the images;
fit multi-order polynomials to the pixel locations of the lane marking lines in each of the images;
select images that are associated with multi-order polynomials having less than a specified amount of curvature;
fit first-order polynomials to the pixel locations of the lane marking lines in each of the selected images; and
identify a location in each of the selected images where the first-order polynomials for the lane marking lines in the selected image intersect.

17. The non-transitory machine-readable medium of claim 15, wherein the instructions that when executed cause the at least one processor to identify the average position of the vanishing points in the at least some of the images comprise:
instructions that when executed cause the at least one processor to:
identify a first average position of the vanishing points in the at least some of the images; and
identify a second average position of the vanishing points in the at least some of the images that fall within a specified range of the first average position.

18. The non-transitory machine-readable medium of claim 15, wherein the one or more extrinsic calibration parameters of the imaging sensor comprise a pitch angle and a yaw angle of the imaging sensor.

19. The non-transitory machine-readable medium of claim 18, wherein the instructions when executed cause the at least one processor to determine the pitch angle and the yaw angle of the imaging sensor as:

$$R_x = \arcsin\left[\frac{\beta}{f_y}\sqrt{\frac{f_x \gamma}{2\alpha^2}}\right]; \text{ and}$$

$$R_y = \arctan\left[\sqrt{\frac{2f_x\gamma}{\alpha^2}}, -\frac{\gamma}{\alpha}\right];$$

wherein:

$R_x$ represents the pitch angle;
$R_y$ represents the yaw angle;

$\alpha = u^* - c_x$;

$\beta = v^* - c_y$;

$\gamma = -f_x + \sqrt{f_x^2 + 4\alpha^2}$;

u* and v* represent coordinates of the average position of the vanishing points;

$f_x$ and $f_y$ represent focal lengths associated with the imaging sensor; and $c_x$ and $c_y$ represent focal centers associated with the imaging sensor.

20. The non-transitory machine-readable medium of claim 18, wherein the measurements associated with the position of the imaging sensor on the vehicle comprise (i) a first measure of horizontal distance from a front of the vehicle's bumper to the position of the imaging sensor, (ii) a second measure of vertical distance from a ground to the position of the imaging sensor, and (iii) a third measure of horizontal distance from a centerline of the vehicle to the position of the imaging sensor.

* * * * *